United States Patent
Chandan et al.

(10) Patent No.: US 6,811,329 B2
(45) Date of Patent: Nov. 2, 2004

(54) SYSTEMS AND METHODS FOR MONITORING PRE-SPLICE HEAT TREATMENT OF OPTICAL FIBERS

(75) Inventors: Harish C. Chandan, Snellvile, GA (US); Masakazu Nakano, Shizuoka-Pref. (JP)

(73) Assignee: Fitel USA Corp., Norcross, GA (US)

( * ) Notice: Subject to any disclaimer, the term of this patent is extended or adjusted under 35 U.S.C. 154(b) by 49 days.

(21) Appl. No.: 10/317,523

(22) Filed: Dec. 12, 2002

(65) Prior Publication Data

US 2004/0114885 A1 Jun. 17, 2004

(51) Int. Cl.[7] .............................................. G02B 6/255
(52) U.S. Cl. ....................................................... 385/95
(58) Field of Search ........................ 385/38, 52, 95–99; 356/337, 342

(56) References Cited

U.S. PATENT DOCUMENTS

| | | | |
|---|---|---|---|
| 5,815,611 A | * | 9/1998 | Dhadwal ..................... 385/12 |
| 6,016,195 A | * | 1/2000 | Peters ......................... 356/342 |
| 6,550,985 B2 | * | 4/2003 | Nakamura et al. ............ 385/96 |
| 6,705,772 B2 | * | 3/2004 | Nakamura et al. ............ 385/96 |
| 2003/0059180 A1 | * | 3/2003 | Tamura et al. ................ 385/96 |
| 2004/0005126 A1 | * | 1/2004 | Yablon ........................ 385/95 |
| 2004/0013373 A1 | * | 1/2004 | Kobayashi et al. ........... 385/96 |
| 2004/0047572 A1 | * | 3/2004 | Hattori ........................ 385/96 |
| 2004/0062495 A1 | * | 4/2004 | Tsuzaki et al. ............... 385/96 |

\* cited by examiner

*Primary Examiner*—Dean A. Reichard
*Assistant Examiner*—Adolfo Nino
(74) *Attorney, Agent, or Firm*—Daniel Kim, Esq.

(57) ABSTRACT

Systems and techniques are described for monitoring a pre-splice heat treatment of an optical fiber. In one described technique, a lead end of a first fiber is prepared for splicing. The lead of the fiber is then loaded into a heat treatment station. While heating the lead fiber end, an optical time domain reflectometer is used to measure reflected backscatter loss from the lead fiber end. The lead fiber continues to be heated end until the measured reflected backscatter loss from the lead fiber end reaches a predetermined level. At that point, the heat treatment is discontinued.

14 Claims, 10 Drawing Sheets

| ITEM | EST LOSS (db) | W/O TAPER SPLICE | | | W/ TAPER SPLICE | | | STRENGTH (kpsi) | RB LOSS | |
|---|---|---|---|---|---|---|---|---|---|---|
| | | 1550nm | 1625nm | 1310nm | 1550nm | 1625nm | 1310nm | | INITIAL | AFTER |
| AVERAGE | 0.289 | 0.1668 | 0.3107 | 0.2383 | 0.1301 | 0.2600 | 0.2342 | 147.022 | 29.9854 | 28.5194 |
| MEDIAN | 0.305 | 0.1538 | 0.3073 | 0.2343 | 0.1253 | 0.2538 | 0.2388 | 149.280 | 29.8640 | 28.4130 |
| STD DEV | 0.065 | 0.0460 | 0.0544 | 0.0243 | 0.0347 | 0.0479 | 0.0192 | 41.244 | 0.5193 | 0.05856 |
| MAXIMUM | 0.43 | 0.243 | 0.389 | 0.301 | 0.206 | 0.354 | 0.255 | 204.72 | 31.537 | 30.309 |
| MINIMUM | 0.22 | 0.090 | 0.217 | 0.201 | 0.083 | 0.186 | 0.198 | 52.73 | 29.737 | 28.047 |
| COUNT | 12 | 12 | 12 | 12 | 12 | 12 | 12 | 11 | 11 | 12 |

140

SYSTEMS AND METHODS FOR MONITORING PRE-SPLICE HEAT TREATMENT OF OPTICAL FIBERS

BACKGROUND OF THE INVENTION

1. Field of the Invention

The present invention relates generally to improvements in the field of fiber optics, and particularly to advantageous aspects of systems and methods for monitoring a pre-splice heat treatment of optical fibers.

2. Description of Prior Art

There is a continuing effort in the optical fiber industry to find ways to reduce optical signal loss when a first type of optical fiber is spliced to a second type of optical fiber. Splice loss may arise for a number of different reasons. For example, splice loss results when the modefield diameter of the first fiber has a modefield diameter that differs from the modefield diameter of the second fiber.

One approach that has been developed to reduce splice loss resulting from modefield diameter mismatch is to apply heat to the splice end of the fiber having the narrower modefield diameter. The applied heat causes a diffusion of the dopants in the narrower modefield fiber, causing an expansion of the modefield diameter at the splice end. Post-splice thermal treatments are described, for example, in Krause, John T. et al., "Splice Loss of Single-Mode Fiber as Related to Fusion Time, Temperature, and Index Profile Alteration," Journal of Lightwave Technology, vol. LT-4, No. 7, 1986, pp. 837–40; Tam, H. Y., "Simple Fusion Splicing Technique for Reducing Splicing Loss between Standard Singlemode Fibres and Erbium-Doped Fibre," Electronics Letters, vol. 27, No. 17, 1991, pp. 1597–99; and Ando, Yasuhiro, "Low-Loss Optical Connector between Dissimilar Single-Mode Fibers Using Local Core Expansion Technique by Thermal Diffusion," IEEE Photonics Technology Letters, vol. 4, No. 8, 1992, pp. 1028–31.

A thermal treatment may also be applied prior to splicing. In that case, heat is applied to a lead end of a fiber having a narrower modefield. The heat causes an expansion of the fiber modefield at the lead end, thereby causing a reduction in splice loss when the fiber is spliced to a second fiber having a larger modefield diameter. However, it has proven difficult to achieve consistent results using a pre-splice heat treatment technique. In one approach, for example, empirical techniques are used to determine an optimal amount of time for heat treatment. However, because of differences in individual fibers and in operator technique, using the same amount of time for each heat treatment may not produce results with a desired level of consistency.

SUMMARY OF INVENTION

Aspects of the invention provide systems and methods for monitoring a pre-splice heat treatment of an optical fiber. In one described method, a lead end of a first fiber is prepared for splicing. The lead of the fiber is then loaded into a heat treatment station. While heating the lead fiber end, an optical time domain reflectometer is used to measure reflected backscatter loss from the lead fiber end. The lead fiber end continues to be heated until the measured reflected backscatter loss from the lead fiber end reaches a predetermined level. At that point, the heat treatment is discontinued.

Additional features and advantages of the present invention will become apparent by reference to the following detailed description and accompanying drawings.

DETAILED DESCRIPTION

Figure 1:
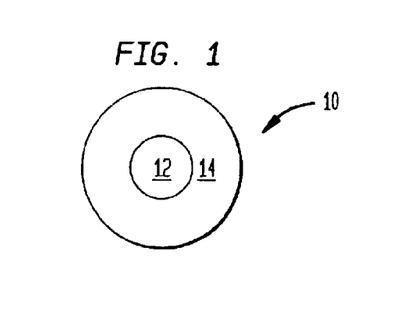
FIGS. 1 and 2 show cross sections of exemplary first and second fibers having different core diameters.
Figure 2:
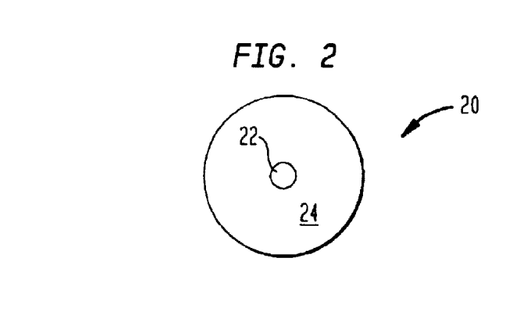

FIG. 1 shows a cross section of an exemplary first optical fiber 10, not drawn to scale. The fiber includes a core region 12 and a cladding region 14 surrounding the core region. FIG. 2 shows a cross section of an exemplary second optical fiber 20, not drawn to scale. The second fiber includes a core region 22 and a cladding region 24 surrounding the core. As shown in FIGS. 1 and 2, the diameter of the first fiber's core region 12 is substantially larger than the diameter of the second fiber's core region 22.

Figure 3:
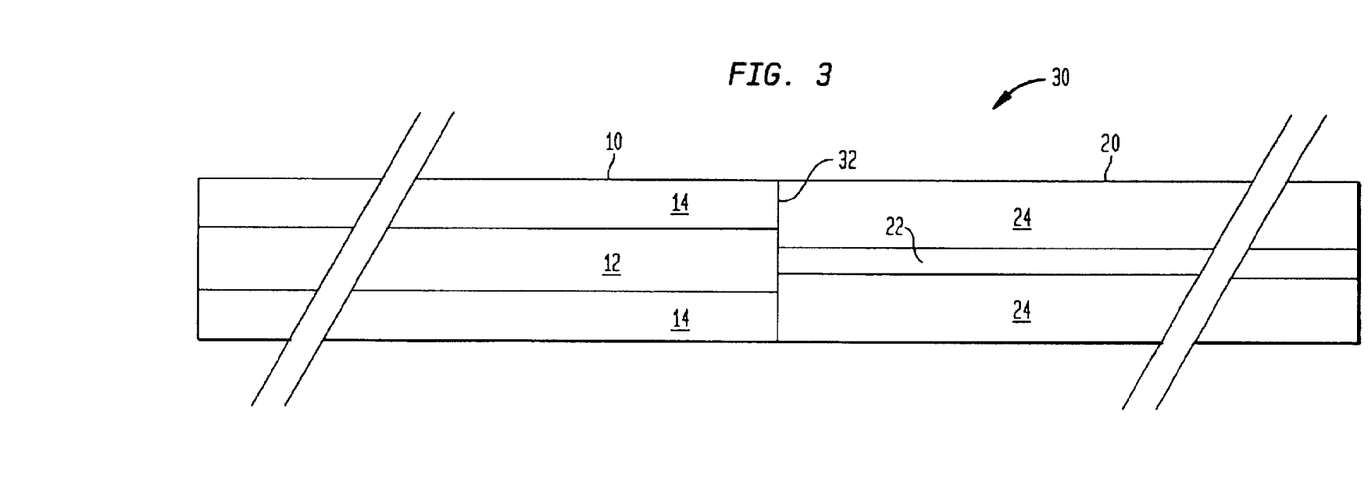
FIG. 3 shows a diagram of an optical fiber transmission line fabricated from the fibers shown in FIGS. 1 and 2.

FIG. 3 shows a side diagram of an exemplary optical transmission line 30, formed by splicing the first fiber 10 to the second fiber 20 at a splice point 32. FIG. 3 clearly illustrates the mismatch in diameter between the first fiber core 12 and the second fiber core 22. This mismatch causes a significant amount of splice loss.

Figure 4:
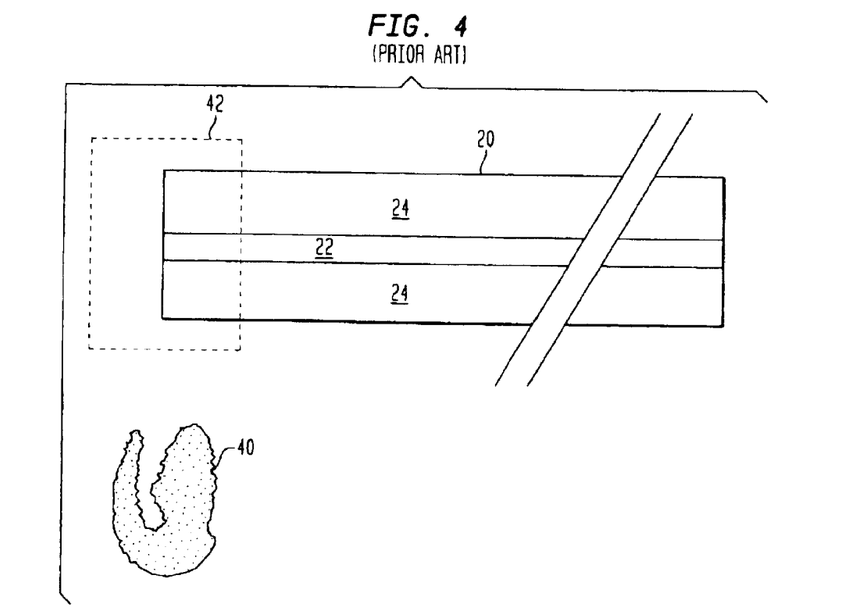
FIG. 4 shows a diagram of a pre-splice heat treatment being applied to the fiber shown in FIGS. 2 and 3 having the narrower modefield diameter.
Figure 5:
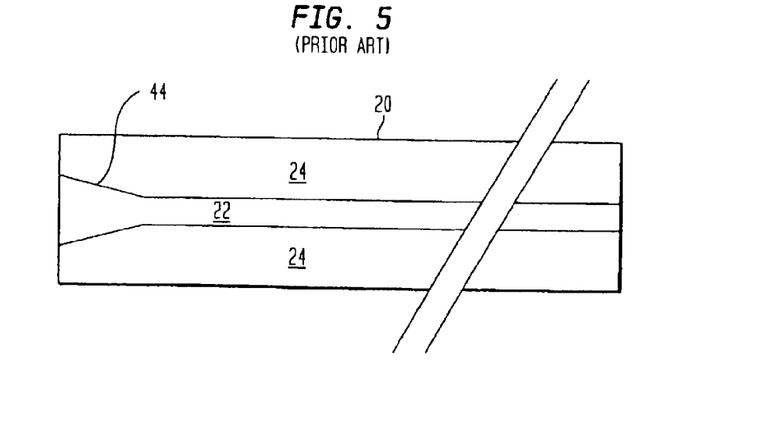
FIG. 5 shows a diagram of the second fiber shown in FIG. 4 with a core that has been expanded by the pre-splice heat treatment.

One technique that has been developed for reducing splice loss is to apply a pre-splice heat treatment to the splice end of the fiber having the smaller core diameter. The pre-splice heat treatment causes the fiber dopants to diffuse, thereby causing an expansion of the core diameter. This technique is illustrated in FIG. 4, in which a flame 40 or other heat source is used to apply heat to a hot zone 42 at the splice end of the first fiber 20. The result of the heat treatment is shown in FIG. 5. As shown in FIG. 5, the heat treatment has caused a region 44 of the fiber core 22 to undergo a tapered expansion.

Figure 6:
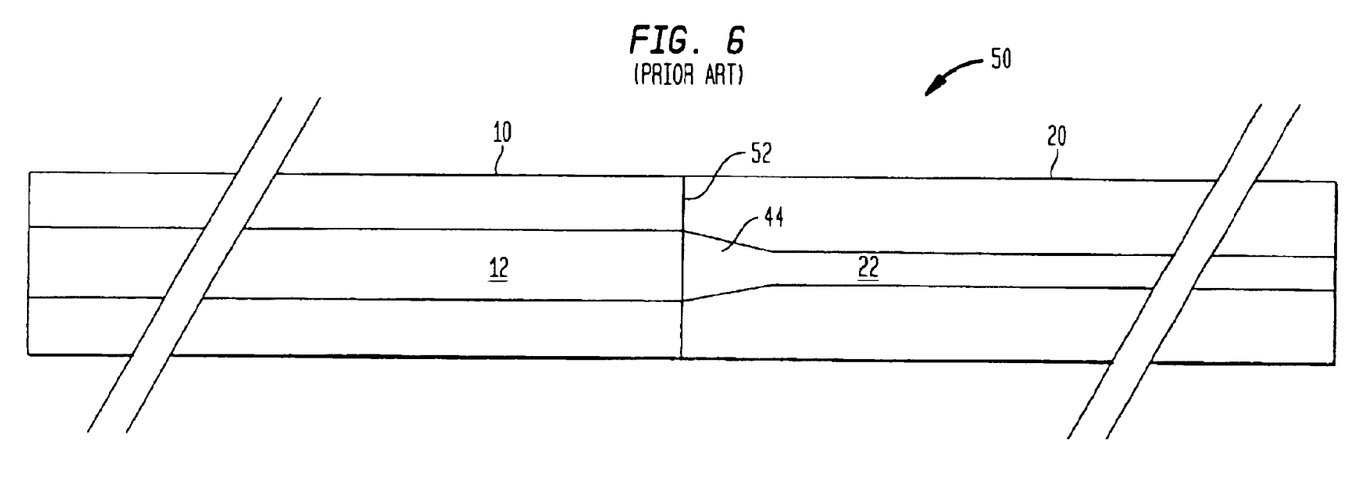
FIG. 6 shows a diagram of an optical fiber transmission line fabricated from a first and second fiber, in which the second fiber has a thermally expanded core.

FIG. 6 shows an optical transmission line 50 that has been fabricated by splicing together a length of the first fiber 10 and a length of the second fiber 20 at splice point 52. The second fiber 20 has been heat-treated as illustrated in FIGS. 4 and 5. As shown in FIG. 6, the expanded region of the second fiber core 22 now has a diameter at the splice point 52 that closely matches the diameter of the first fiber core 12. By reducing core diameter mismatch at the splice point 52 in this way, a significant reduction in splice loss can be achieved.

It is desirable to be able to achieve consistent results over a large number of splices performed by different operators. One currently used technique to achieve consistency is to use empirical techniques to determine an optimal amount of time for the pre-splice treatment illustrated in FIGS. 4 and 5. Once this optimal time has been determined, it is then used for all subsequent heat splices.

However, this approach has proved to be unsatisfactory. Because of variations in fiber, equipment, and operator technique, simply controlling the amount of time for the heat treatment may lead to inconsistent results. There is thus a need for a technique that provides continuous, quantitative feedback to the operator as the heat treatment is being performed. A quantitative technique allows an operator to cut off the applied heat as soon as a desired amount of core expansion has occurred.

Figure 7:
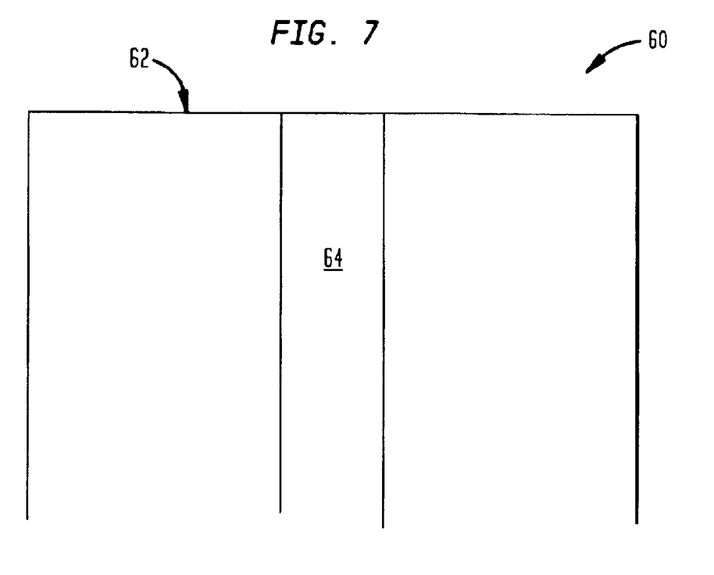
FIGS. 7 through 9 are a series of diagrams illustrating the relationship between thermal core expansion and fiber end curvature.
Figure 8:
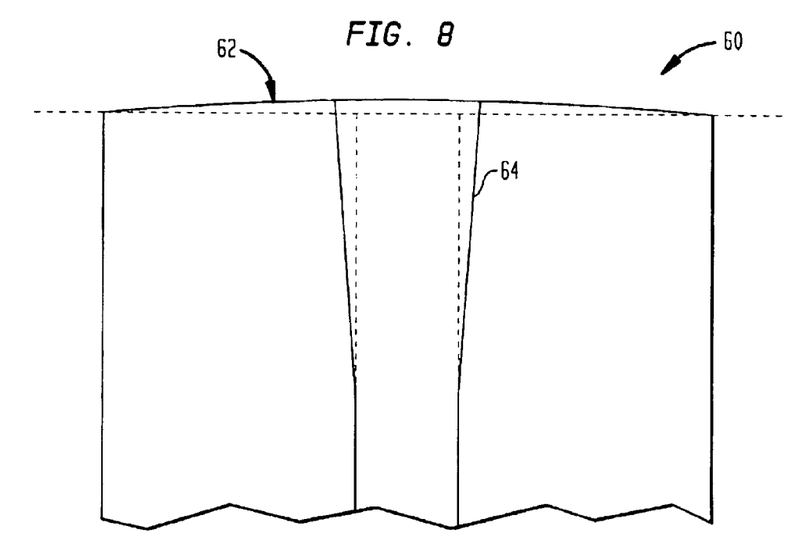
Figure 9:
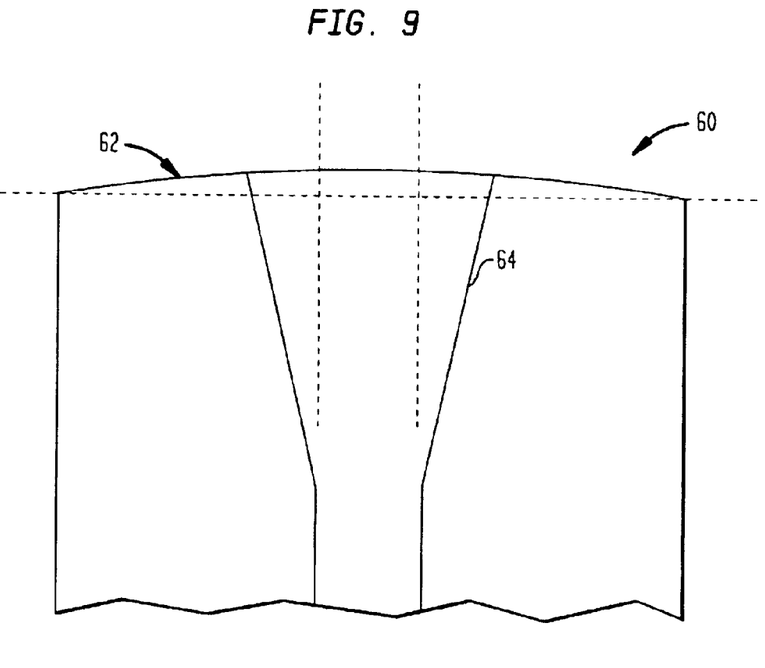

According to an aspect of the invention, the shape of the tapered region of the smaller core diameter fiber is continuously monitored during the pre-splice heat treatment by monitoring the curvature of the splice end of the fiber. The relationship between the shape of the tapered region and the curvature of the splice end is illustrated in FIGS. 7–9. FIG. 7 shows a closeup view of an exemplary fiber 60. The fiber 60 has been cleaved to create a flat splice end 62 that is perpendicular to the longitudinal axis of the fiber 60.

In FIG. 8, the fiber end has been heated to cause an expansion of the fiber core 64. As shown in FIG. 8, this expansion of the fiber core 64 is accompanied by a curvature of the fiber end 62. In FIG. 9, the fiber end has been further heated to cause a further expansion of the fiber core 64. As shown in FIG. 9, the further expansion of the fiber core 64 is accompanied by an increased curvature of the fiber end 62.

It has been found that the amount of fiber end curvature provides a reliable indication of the amount of core expansion 64. It should be noted that FIGS. 7–9 are not drawn to scale. The amount of curvature is typically not as pronounced. It should be noted that the amount of curvature typically does not present any difficulties in the execution of a fusion splice.

According to an aspect of the present invention, the amount of fiber end curvature may be continuously monitored by using an optical time domain reflectometer (OTDR). In a typical optical fiber, a certain amount of signal loss occurs because a portion of the light sent down an optical fiber is reflected back to the source due to a physical phenomenon known as "backscattering." An OTDR measures the amount of backscatter loss by sending a reference pulse of light down the length of the fiber and measuring the amount of light that is reflected back. The OTDR then graphs the backscatter loss against a time domain. Backscatter loss is typically expressed in decibels (dB).

Optical fiber is typically packaged by winding it onto a reel. A first end of the fiber is affixed to the reel in such a way that the end of the fiber will be accessible after the fiber has been wound onto the reel. The fiber is then wound onto the reel, leaving a second end available for unwinding. For the purposes of the present discussion, the first end of the fiber is referred to herein as the "tail end" of the fiber. The second end of the fiber is referred to herein as the "lead end" or "splice end" of the fiber.

Figure 10:
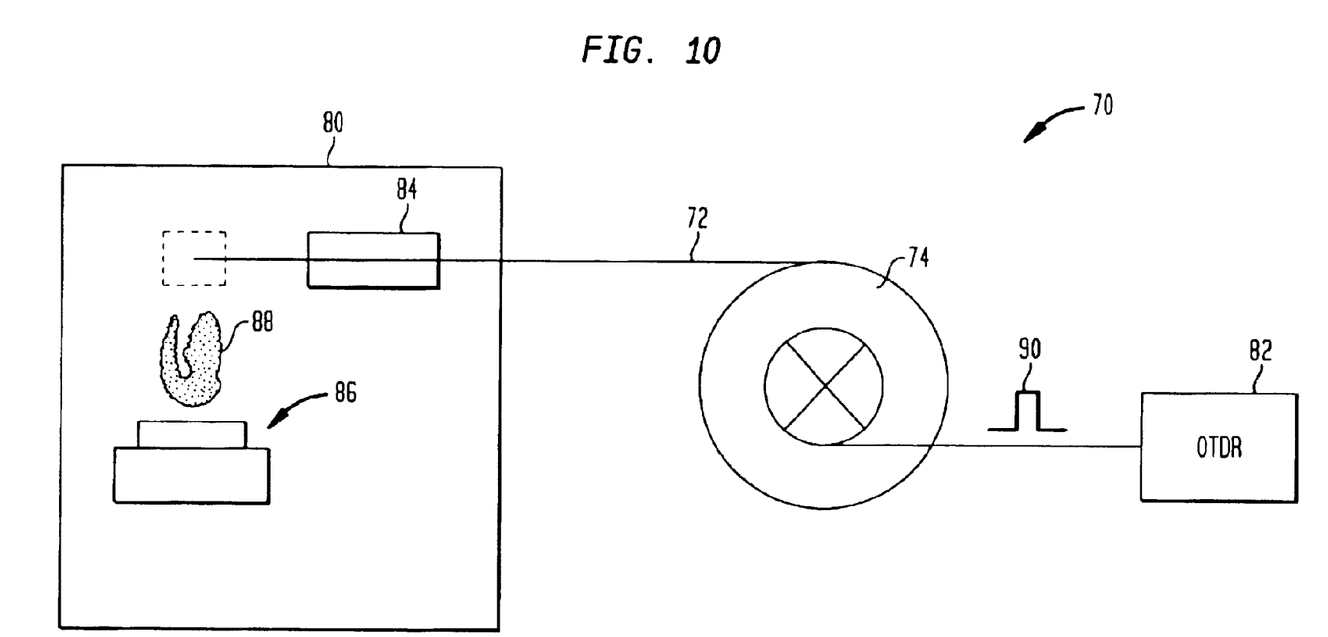
FIG. 10 shows a diagram of a system for monitoring core expansion according to an aspect of the invention.

FIG. 10 shows a diagram of a system 70 according to a further aspect of the invention. The system 70 is used to apply a pre-splice treatment to an optical fiber 72 that has been wound onto a reel 74. The lead end 76 of the fiber 72 has been stripped and cleaved and loaded into a heat treatment station 80. The tail end 78 of the fiber 72 has been connected to an OTDR.

The heat treatment station 80 includes a fiber mount 84 for holding the lead end 76 of the fiber 72. The heat treatment station 80 further includes a heat source 86, which in the present example is provided by a methanol burner that produces a controllable flame 88. The OTDR 82 sends a pulse of light 86 down the length of the optical fiber 72 and measures the backscattered light.

Initially, when the lead end 76 of the fiber 72 has been freshly cleaved, the lead end 76 provides a relatively highly reflective surface. Thus, when the OTDR 82 sends a light pulse 90 down the length of the fiber, a relatively large amount of light is backscattered from the fiber end, representing a relative large amount of backscatter loss. As the heat treatment progresses, the fiber end starts to develop a curvature, as illustrated in FIGS. 7 through 9, discussed above. The curvature tends to decrease the reflectivity of the fiber end, thereby reducing the amount of backscatter loss. The diffusion of dopants in the heated portion of the fiber may also contribute to the reduction of the amount of backscatter loss.

Thus, a desired amount of fiber end curvature can be reliably obtained by monitoring the amount of backscatter loss. The backscatter from the fiber end is measured prior to the application of the heat treatment. The backscatter from the splice end is then continuously monitored until there occurs a predetermined amount of dropoff in the amount of backscatter loss. At that point, the heat source 82 is turned off.

FIGS. 11–16 show a series of diagrams illustrating an exemplary embodiment of the present invention. In this example, a lead end of a length of OFS Fitel Super Large Area (SLA) fiber is spliced to a lead end of a length of OFS Fitel Inverse Dispersion Fiber (IDF). IDF is available in a number of different versions having different slopes. In the present example, a version of IDF is used that has a negative slope that is double the positive slope of the SLA fiber. Thus, the IDF is referred to herein as IDF×2.

SLA has a core diameter of approximately 12 microns, and IDF×2 has a core diameter of approximately 6 microns. In the present example, a pre-splice heat treatment is used to create a tapered expansion of the IDF×2 core, such that the IDF×2 core has a diameter of approximately 12 microns at the splice point, thereby minimizing splice loss resulting from core diameter mismatch. It has been observed that a suitably tapered IDF×2 core at the IDF×2 lead end corresponds to an OTDR-measured backscatter loss of approximately 28.0 dB.

Figure 11:
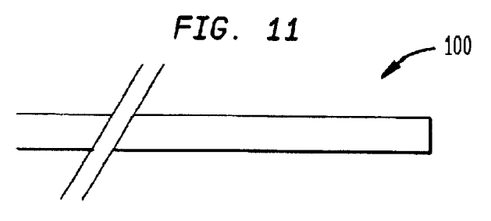
FIGS. 11–16 show a series of diagrams illustrating the fabrication of an optical fiber transmission line according to an aspect of the invention.
Figure 12:
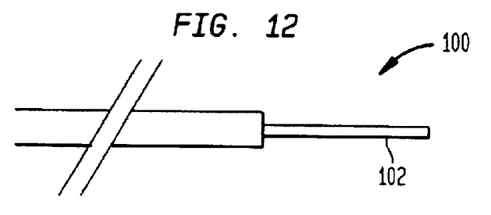
Figure 13:
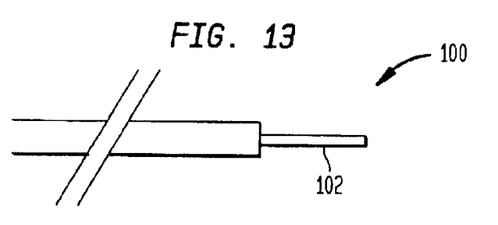

FIG. 11 shows a diagram of a lead end of an exemplary length of IDF×2 fiber 100. The fiber 100 is first prepared for splicing by stripping off its outer protective layer. A Vytran hot stripper was used, leaving a stripped fiber end 102, shown in FIG. 11. The stripped fiber end 102 has a length of 25 mm. A Vytran cleaver is then used to form a fiber end that is suitable for splicing. The stripped and cleaved fiber end 102, which has a length of approximately 18 mm, is shown in FIG. 13.

Figure 14:
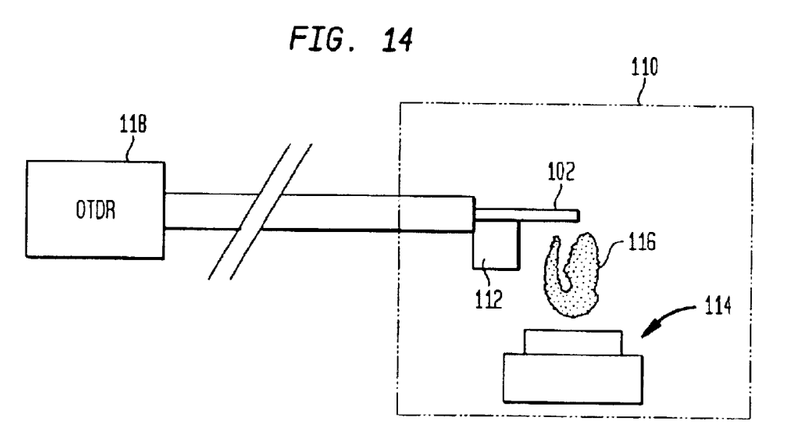

The stripped and cleaved fiber end 102 is then loaded into a Vytran modefield expander unit 110. The expander unit 110 has a vacuum air clamp 112 with a length of approximately 8 mm that is used to grip the base of the stripped fiber 102, leaving a free bare fiber length of approximately 10 mm. The expander unit 110 further includes a heating unit 114 that is positioned to deliver a methanol flame 116 to the tip of the stripped fiber 102.

As described above, the tail end of the IDF×2 100 is mounted to an OTDR 118, which monitors reflected backscatter loss. As mentioned above, in this example, it has been found that a suitable expanded modefield shape is obtained when the reflected backscatter loss reaches a threshold of 28.0 dB. After the modefield has been properly expanded, the IDF×2 100 is ready for splicing to a length of SLA fiber 120, shown in FIG. 15.

Figure 15:
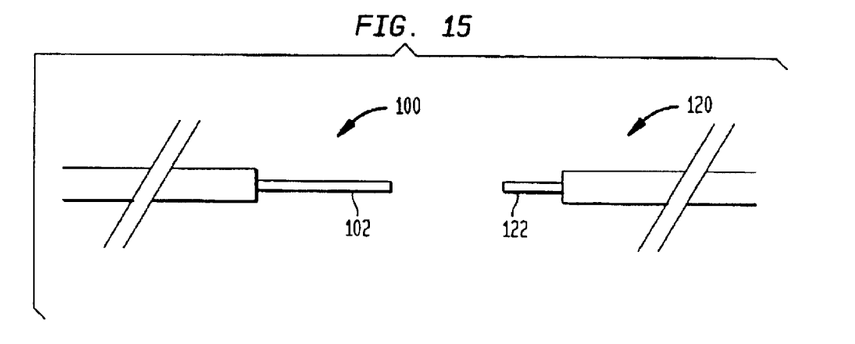
Figure 16:
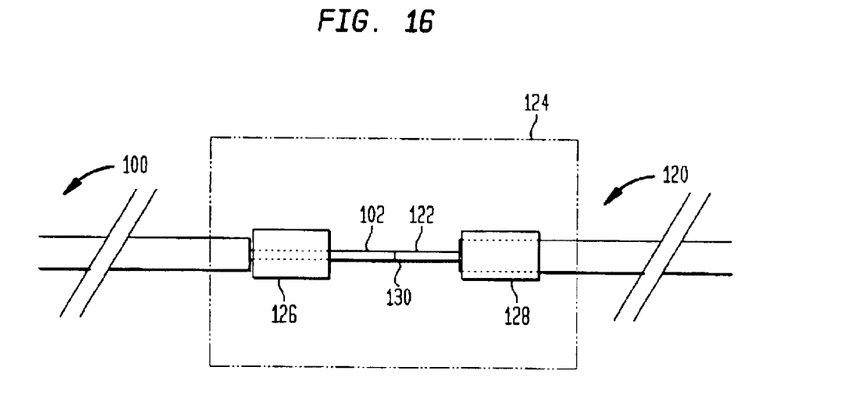

FIG. 15 shows the treated IDF×2 100, and a stripped and cleaved lead end of an SLA fiber 120. The bare end of the SLA fiber 120 is prepared using an Ericsson splicing tool, and has a length of approximately 6 mm. In FIG. 16, the two fiber ends 102 and 122 have been loaded into an Ericsson fusion splicer 124. Fiber ends 102 and 122 have been loaded into respective fiber clamps 126 and 128, so that approximately 6 mm of each fiber end is exposed for splicing. A suitable splicing program is then used to splice the two fiber ends together at a splice point 130.

Figure 17:
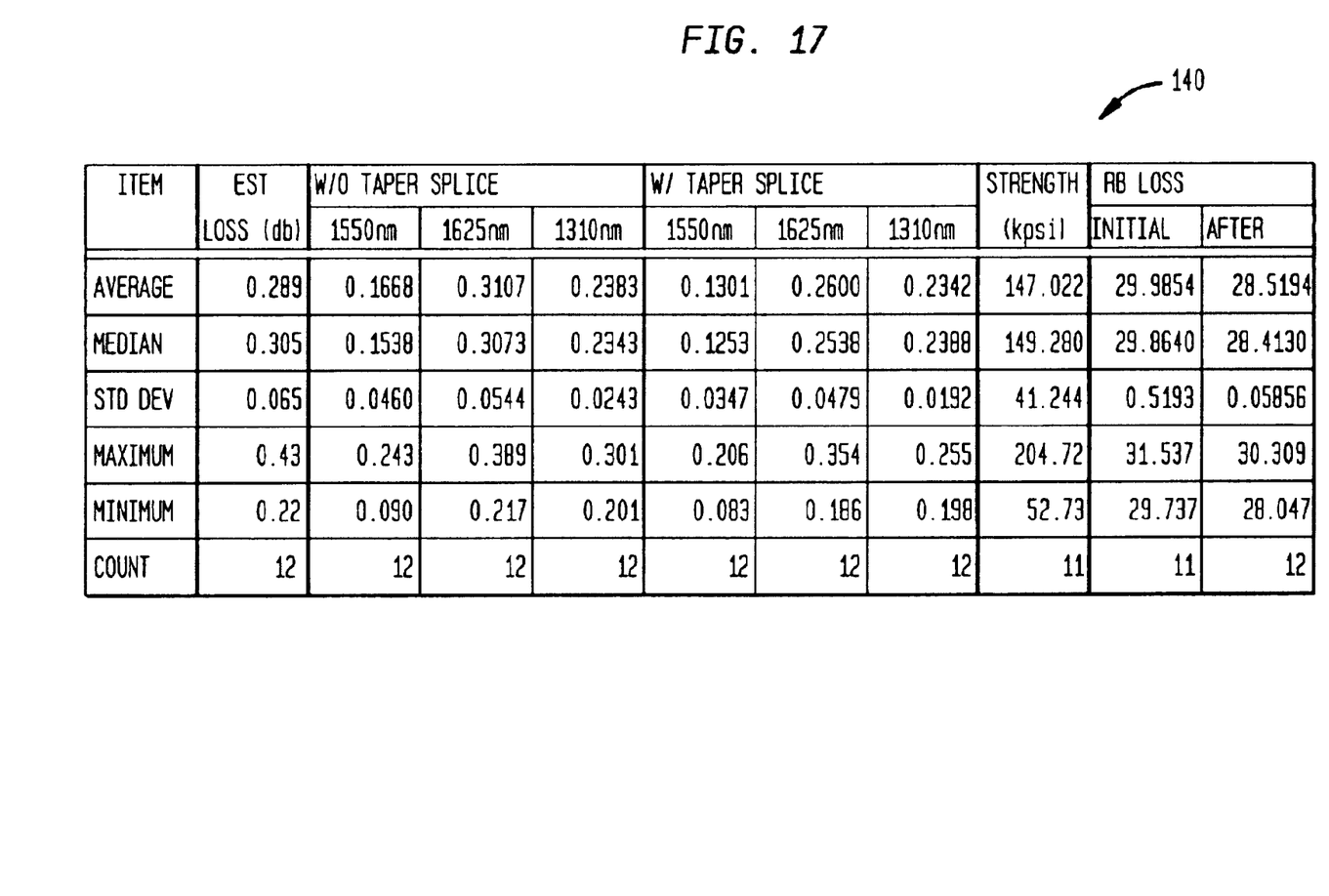
FIG. 17 shows a table of experimental results obtained from a series of optical fiber transmission lines fabricated according to an aspect of the invention.

FIG. 17 shows a table 140 setting forth results obtained from practicing the invention on 12 sample splices. The table shows the correlation between OTDR measured backscatter loss and splice loss.

Figure 18:
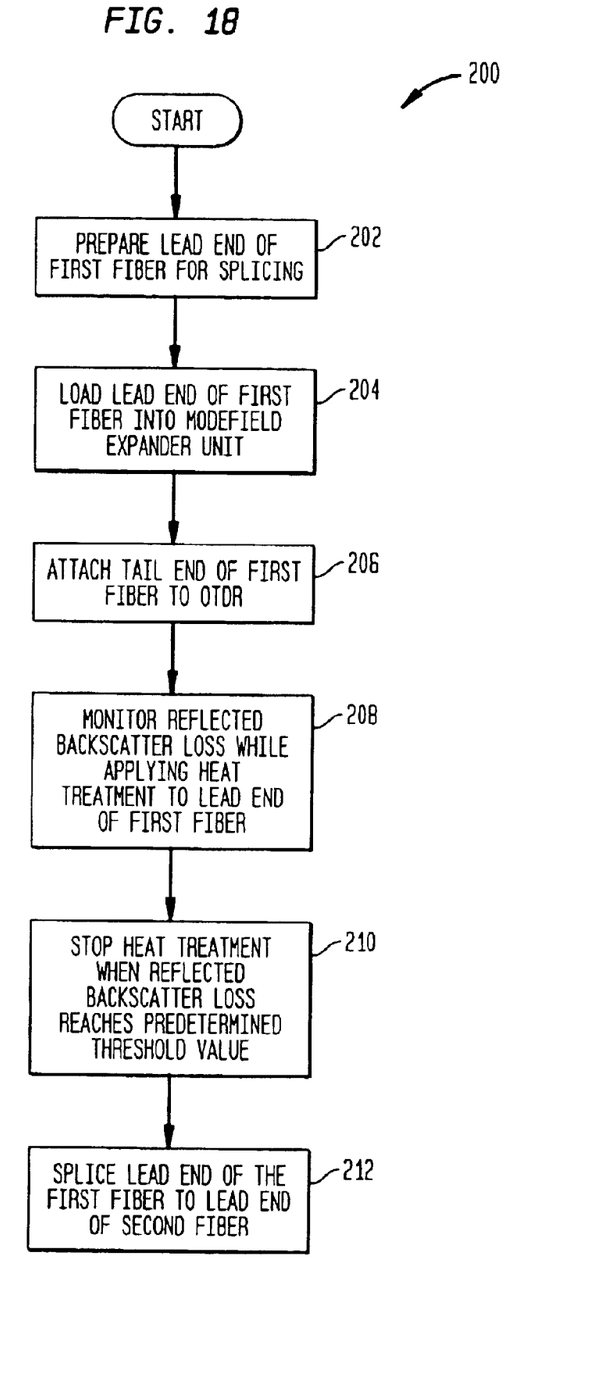
FIG. 18 shows a flowchart of a method for fabricating an optical fiber transmission line according to an aspect of the invention.

FIG. 18 shows a flowchart of a method 200 according to an aspect of the invention. In step 202, a lead end of a first fiber is prepared for splicing. In step 204, the lead end of the first fiber is loaded into a modefield expander unit. In step 206, the tail end of the first fiber is attached to an OTDR. In step 208, the backscatter loss is monitored, while applying a pre-splice heat treatment to the lead end of the first fiber. In step 210, the heat treatment is stopped when the reflected backscatter loss reaches a predetermined threshold value. As discussed above, when this threshold value is reached, the core of the first fiber has been expanded and shaped to minimize splice loss when the first fiber is spliced to a second fiber having a core diameter that is greater than the core diameter of the first fiber. In step 212, the lead end of the first fiber is spliced to the lead end of the second fiber.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

We claim:

1. A method for monitoring a pre-splice heat treatment of a first optical fiber having a lead end and a tail end, comprising:

(a) preparing the lead end of the first fiber for splicing;

(b) loading the first fiber lead end into a heat treatment station;

(c) applying heat to the first fiber lead end;

(d) while heating the first fiber lead end, using an optical time domain reflectometer connected to the tail end of the first fiber to measure reflected backscatter loss from the first fiber lead end; and (e) continuing to heat the first fiber lead end until measured reflected backscatter loss from the first fiber lead end reaches a predetermined level corresponding to a desired thermal expansion of the first fiber modefield at the first fiber lead end.

2. The method of claim 1, wherein the step of preparing the first fiber lead end for splicing includes stripping and cleaving the first fiber lead end.

3. The method of claim 1, wherein in step (e) the predetermined level of reflected backscatter loss corresponds to a thermal expansion of a portion of the first fiber modefield at the first fiber lead end that minimizes splice loss when the first fiber lead end is spliced to a lead end of a second fiber having a larger modefield diameter than the first fiber.

4. The method of claim 3, wherein in step (e) the predetermined level of reflected backscatter loss corresponds to a tapered thermal expansion of a portion of the first fiber modefield at the first fiber lead end.

5. The method of claim 4, wherein the tapered expanded portion of the first fiber modefield at the first fiber lead end provides an adiabatic transition between a narrower modefield diameter and a wider modefield diameter.

6. The method of claim 3, wherein prior to splicing the first fiber lead end to the second fiber lead end, the second fiber lead end is prepared for splicing.

7. The method of claim 6, wherein the step of preparing the second fiber lead end includes stripping and cleaving the second fiber lead end.

8. A system for monitoring a pre-splice heat treatment of a first optical fiber having a lead end and a tail end, comprising:

a heat treatment station including a fiber holding clamp for holding the lead end of the first fiber over a heat source to cause a thermal expansion of the first fiber modefield at the first fiber lead end; and an optical time domain reflectometer mounted to the tail end of the first fiber for measuring reflected backscatter loss at the first fiber lead end.

9. The system of claim 8, wherein the heat source is a methanol burner.

10. The system of claim 9, wherein the methanol burner forms a heating zone for heating the lead end of the first fiber.

11. The system of claim 8, wherein there is a predetermined level of measured reflected backscatter loss from the first fiber lead end corresponding to a desired thermal expansion of the first fiber modefield at the first fiber lead end.

12. The system of claim 11, wherein the predetermined level of reflected backscatter loss corresponds to a thermal expansion of a portion of the first fiber modefield at the first fiber lead end that minimizes splice loss when the first fiber lead end is spliced to a lead end of a second fiber having a larger modefield diameter than the first fiber.

13. The system of claim 12, wherein the predetermined level of reflected backscatter loss corresponds to a tapered thermal expansion of a portion of the first fiber modefield at the first fiber lead end.

14. The system of claim 13, wherein the tapered expanded portion of the first fiber modefield at the first fiber lead end provides an adiabatic transition between the first fiber modefield and the second fiber modefield.

* * * * *